US012254417B2

(12) United States Patent
Molteni et al.

(10) Patent No.: US 12,254,417 B2
(45) Date of Patent: Mar. 18, 2025

(54) AUTOMATICALLY VALIDATING DECISION TABLES

(71) Applicant: Red Hat, Inc., Raleigh, NC (US)

(72) Inventors: Luca Molteni, Milan (IT); Matteo Mortari, Milan (IT)

(73) Assignee: Red Hat, Inc., Raleigh, NC (US)

( * ) Notice: Subject to any disclaimer, the term of this patent is extended or adjusted under 35 U.S.C. 154(b) by 1075 days.

(21) Appl. No.: 17/171,234

(22) Filed: Feb. 9, 2021

(65) Prior Publication Data

US 2022/0253718 A1 Aug. 11, 2022

(51) Int. Cl.
*G06N 5/01* (2023.01)

(52) U.S. Cl.
CPC ...................... *G06N 5/01* (2023.01)

(58) Field of Classification Search
CPC ........................................................ G06N 5/01
USPC ............................................................ 706/11
See application file for complete search history.

(56) References Cited

U.S. PATENT DOCUMENTS

| | | | |
|---|---|---|---|
| 10,068,189 B2 | 9/2018 | Couper | |
| 2004/0024790 A1* | 2/2004 | Everett | G06F 16/284 |
| 2007/0168334 A1* | 7/2007 | Julien | G06F 16/284 |

OTHER PUBLICATIONS

Alappanavar, et al., "Automating the normalization process for relational database model", IJERA, vol. 3, Issue 1, Jan.-Feb. 2013, pp. 1826-1831, 2013 (Year: 2013).*

Demba, M., "Algorithm for Relational Database Normalization up to 3NF," International Journal of Database Management Systems, 2013, https://www.researchgate.net/publication/269674039_Algorithm_for_Relational_Database_Normalization_Up_to_3NF.
"Normal Forms and Normalization," IT.UU, 2004, http://www.it.uu.se/research/group/udbl/dbt-ht2004/le4-normalizationx.pdf.
"Higher Normal Forms—Boyce-Codd Normal Form:," Databasedev, Downloaded from Internet 2021, http://www.databasedev.co.uk/higher_norm_form.html.
Ramamurthy, M., et al., "Decision Tree Based Classification Type Question/Answer E-Assessment System," 2016, https://go.gale.com/ps/anonymous?id=GALE%7CA450903502&sid=googleScholar&v=2.1&it=r&linkaccess=abs&issn=19950772&p=AONE&sw=w.
"Database Design: Normalization Note & Exercises (up to 3NF)," Javaguicodexample, Dowloaded from Internet 2021, https://www.javaguicodexample.com/normalizationnotes.pdf.
Silver, B., "Decision Table Analysis in DMN," 2017, https://dmcommunity.files.wordpress.com/2017/06/dc2017-brucesilver.pdf.
Ketkar, P., et al., "Possible Algorithms of 2NF and 3NF for DBNorma—A Tool for Relational Database Normalization," Proc. of Int. Conf. on Advances in Computer Science, 2010, http://citeseerx.ist.psu.edu/viewdoc/download?doi=10.1.1.672.9796&rep=rep1&type=pdf.

* cited by examiner

*Primary Examiner* — Tsu-Chang Lee (57) ABSTRACT

Decision tables can be automatically validated on a computer according to some examples. In one example, a system can determine a first set of values associated with a first column of a decision table and a second set of values associated with a second column of the decision table. The system can then determine that each respective value in the first set of values has a one-to-one relationship with a corresponding value in the second set of values. Based on determining that each respective value in the first set of values has the one-to-one relationship, the system determines that the first column and second column violate a third normal form (3NF) constraint. The system may then automatically rearrange the first and second columns into separate decision tables that comply with the 3NF constraint.

20 Claims, 4 Drawing Sheets

AUTOMATICALLY VALIDATING DECISION TABLES

TECHNICAL FIELD

The present disclosure relates generally to computerized validation of decision tables. More specifically, but not by way of limitation, this disclosure relates to using a computing device to automatically validate decision tables.

BACKGROUND

Decision tables are commonly used to specify which operations to execute based on given input conditions. Each entry in the decision table can specify whether (or in what order) a corresponding operation is to be performed based on the set of input conditions associated with the entry. Although decision tables are popular due to their readability and ease of understanding, the decision logic expressed in decision tables can also be represented in other ways, such as with decision trees or in a programming language as if-then-else and switch-case statements.

Decision tables are used in a variety of industries for numerous purposes. One use of decision tables is to drive the logic of a computer program. For example, a decision table such as a lookup table may be embedded in the logic of a computer program to control how the computer program responds to certain inputs. In one such example, a computer program can include a lookup table that contains a range of possible input values and a function pointer to the section of program code used to process the input. The computer program can rely on the lookup table to drive the program's logic. Another use of decision tables is to describe decisions and rules for an organization, for example using the Decision Model & Notation (DMN) standard.

DETAILED DESCRIPTION

Decision tables are commonly used in a variety of industries, for example to describe decision logic for a computer program or an organization. Such decision tables are typically drafted by experts to comply with certain rules and best practices that reduce redundancy, improve flexibility, improve integrity, and improve logical consistency. In particular, experts may manually apply normalization concepts to decision tables in an effort to structure the decision tables in accordance with a series of "normal forms," which originated in the context of relational databases. Examples of these normal forms are the first normal form (1NF), the second normal form (2NF), and the third normal form (3NF). A decision table can be in the first normal form if each entry in the table is atomic and unique. A decision table can be in the second normal form if it is in the first normal form, and if the decision table only includes input conditions that are relevant to the outcome. A decision table can be in a third normal form if it is in the second normal form, and if the decision table lacks dependencies among the input conditions such that all of the input conditions are independent of one another. Decision tables that are in third normal form can avoid duplicate entries, reduce the chance of input errors, and avoid logical inconsistencies. As a result, it may be desirable for experts to structure a decision table in third normal form. This may involve decomposing the single decision table into several decision tables that make the input dependencies explicit.

Although experts may wish to ensure their decision tables are in third normal form, it can be challenging for them to do so. For example, an expert may manually and subjectively analyze a decision table to determine if any dependencies exist among the input conditions therein. If so, the expert can determine that the decision table violates the third normal form requirements and make appropriate adjustments. But, such input dependencies are often not readily apparent (e.g., they are "hidden") and may be transitive in nature, making them easy for an expert to accidentally miss. As a result, an expert may mistakenly think that a decision table is in a third normal form when it actually is not. And if the decision table is then used, for example to drive the decision logic of a computer program, numerous problems may arise. For example, the decision table may have logical inconsistencies that can cause the computer program to malfunction. Additionally, the decision table may take up more space in computer memory or may be stored in computer memory in a less flexible (e.g., suboptimal) way than would otherwise be required if the decision table was further decomposed into several decision tables that comply with third normal form constraints.

Some examples of the present disclosure can overcome one or more of the abovementioned problems by automatically validating a decision table to ensure that it complies with third normal form constraints. For example, a computer can execute a decision table validation (DTV) tool configured to automatically analyze a decision table to determine whether the decision table violates a third normal form constraint. The DTV tool can determine if the decision table violates the third normal form constraint by executing an iterative process that includes multiple iterations. Each iteration can involve selecting a pair of columns (e.g., input conditions) from the decision table and analyzing the values in the pair of columns to determine if they have a dependency relationship. This analysis can be performed according to a predefined set of rules, which are described in greater detail later on. If the values in the pair of columns have a dependency relationship, the DTV tool can generate a notification indicating that the pair of columns violate the third normal form constraint. Additionally or alternatively, the processor can automatically separate the pairs of columns into separate decision tables that comply with third normal form constraints. This process can be repeated for every pair of columns in the decision table, so that the decision table can be refactored into third normal form. In this way, the DTV tool can automatically assist a user with identifying decision tables that are not compliant with third normal form and restructuring those decision tables to be compliant with third normal form. This, in turn, can significantly reduce errors associated with computer programs and other entities that rely on such decision tables for decision logic.

As one specific example, a computer program may control the functionality of a wind turbine based on the following decision table:

TABLE 1

Example Decision Table

| Turbine Age (years) | Turbine Speed (RPM) | Breakdown Risk | Computer Function |
|---|---|---|---|
| >=21 | <15 | "Medium" | Function_1 |
| >=21 | >=15 | "High" | Function_2 |
| <21 | <15 | "Medium" | Function_1 |

Since the computer program will determine a decision output (e.g., a computer function to execute) based on the values in the first three columns, the first three columns can be referred to as input columns and the fourth column can be referred to as an output column. There is a hidden dependency between the second and third columns, in that the speed of the turbine determines the breakdown risk independently of the age of the turbine. That is, no matter the age of the turbine, the risk will always be "Medium" if the speed is less than 15 RPM and the risk will always be "High" if the speed is greater than 15 RPM. This may be a somewhat counterintuitive dependency, since one would naturally think that turbine age would play a larger role in breakdown risk than turbine speed. As a result, this hidden dependency may be missed upon manual inspection of the decision table by an expert.

In the above example, the DTV tool can automatically analyze the decision table and identify the hidden dependency between the second and third columns. Based on the presence of the hidden tendency, the DTV tool can notify the user that the decision table does not comply with a third normal form constraint. The DTV tool can also notify the user of the hidden dependency between the second and third columns. This may allow for the decision table to be broken down into multiple separate decision tables that comply with third normal form. For example, the user may manually refactor the decision table into two separate decision tables that comply with third normal form. Alternatively, the DTV tool can automatically refactor the decision table into two separate decision tables that comply with third normal form. Either way, by restructuring the original decision table as multiple separate decision tables that comply with third normal form, the resulting decision tables can have fewer redundancies and can be more flexibly stored in computer memory (e.g., across two or more memory devices or memory sectors). Additionally, logical inconsistencies may be avoided that could otherwise cause the computer program to call the wrong function or otherwise operate improperly.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
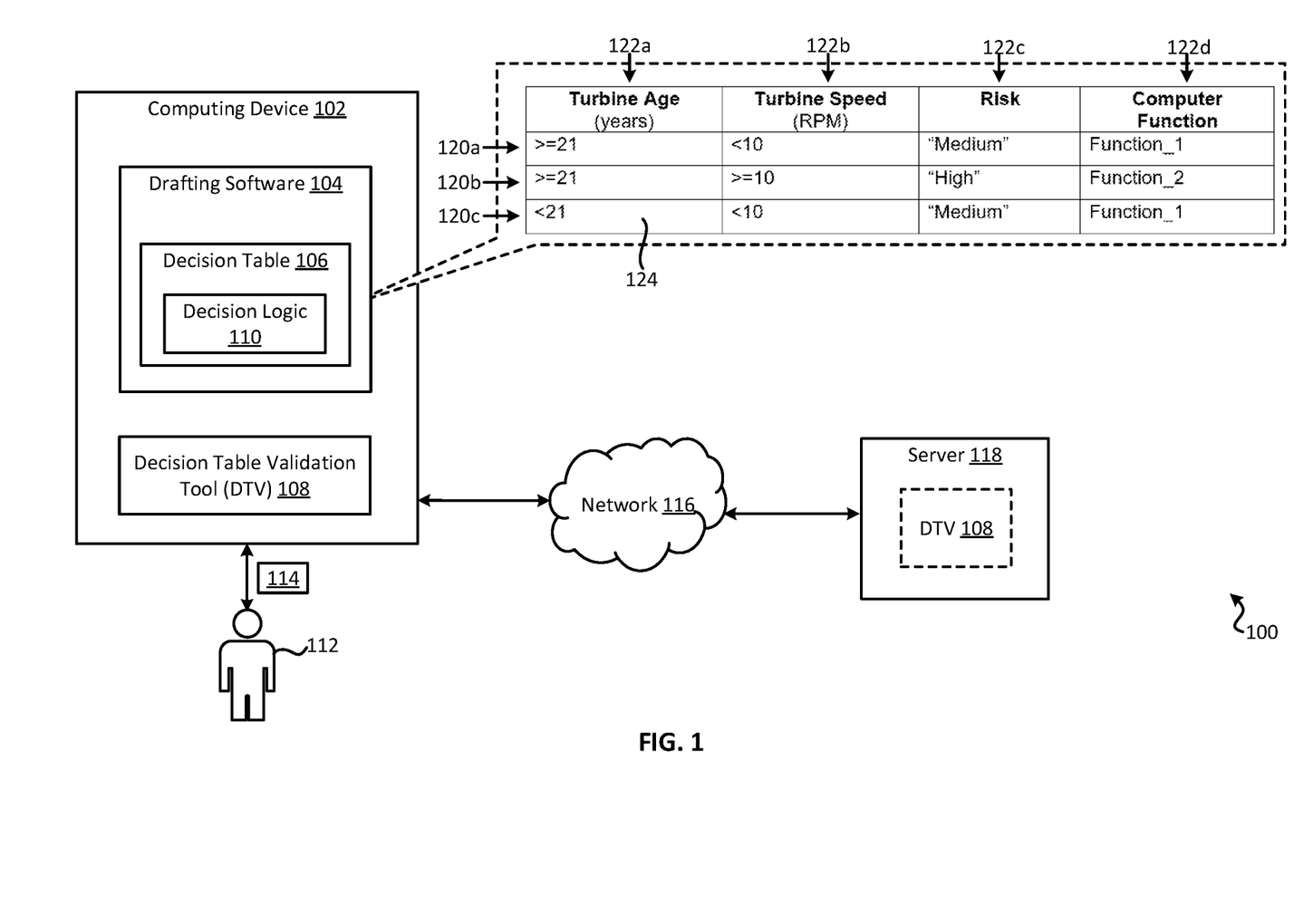
FIG. 1 is a block diagram of an example of a system for automatically validating decision tables according to some aspects of the present disclosure.

FIG. 1 is a block diagram of an example of a system 100 for automatically validating decision tables according to some aspects of the present disclosure. In this example, the system 100 includes a computing device 102, such as a laptop computer, desktop computer, server, tablet, or mobile phone. The computing device 102 includes drafting software 104 for drafting a decision table 106 that contains decision logic 110 (e.g., for a DMN model or computer program).

Examples of the drafting software 104 can include word processing software such as Microsoft Word®, DMN editor by Red Hat®, or a web-based editor included in a website. A user 112 can draft the decision table 106 using the drafting software 104.

One example of the decision table 106 is shown in a dashed box in FIG. 1. This decision table 106 is similar to Table 1 described above. The decision table 106 includes four columns 122a-d. The first three columns 122a-c are input columns that include input conditions. The fourth column 122d is an output column that indicates an action to take in response to a set of input conditions. The decision table 106 also includes three entries 120a-c (e.g., records). Each of the entries 120a-c corresponds to a unique row of the decision table 106. The entries define the decision logic 110 that, for example, may be used by a computer program or organization to perform certain functions in response to certain input conditions. The points where rows and columns intersect in the decision table 106 are referred to as cells. Cells in an input column can be referred to as input cells, and cells in an output column can be referred to as output cells. Each cell of the decision table 106 can have a value. Values can include numbers, letters, symbols, or any combination thereof. For example, cell 124 includes the value "<21". While the decision table 106 only includes four columns 122a-d and three entries 120a-c for simplicity, decision tables can include any number and combination of columns and entries.

The system 100 can also include a decision table validation (DTV) tool 108. The DTV tool 108 is software that is executable for analyzing the decision table 106 to determine whether it complies with third normal form constraints. If the decision table 106 does not comply with third normal form constraints, the DTV tool 108 can generate one or more notifications 114 indicating third normal form violations to the user 112. Additionally or alternatively, the DTV tool 108 can rearrange the decision table 106 into separate decision tables that conform to third normal form requirements.

In some examples, the DTV tool 108 may be standalone software that is located on the computing device 102 and configured to operate independently of the drafting software 104. In other examples, the DTV tool 108 can be a plugin or extension for the drafting software 104. In still other examples, the DTV tool 108 can be located on a server 118 that is remote from the computing device 102. The computing device 102 can transmit (e.g., upload) the decision table 106 to the server 118 over a network 116, such as a local area network or the Internet. The server 118 can receive the decision table 106 and responsively execute the DTV tool 108 to analyze the decision table 106. If the server 118 determines that the decision table 106 does violate third normal form constraints, the server 118 can output a corresponding notification 114 to the user 112 via the network 116 and/or automatically rearrange the decision table 106 into two or more separate decision tables that do not violate the third normal form constraints.

Figure 2:
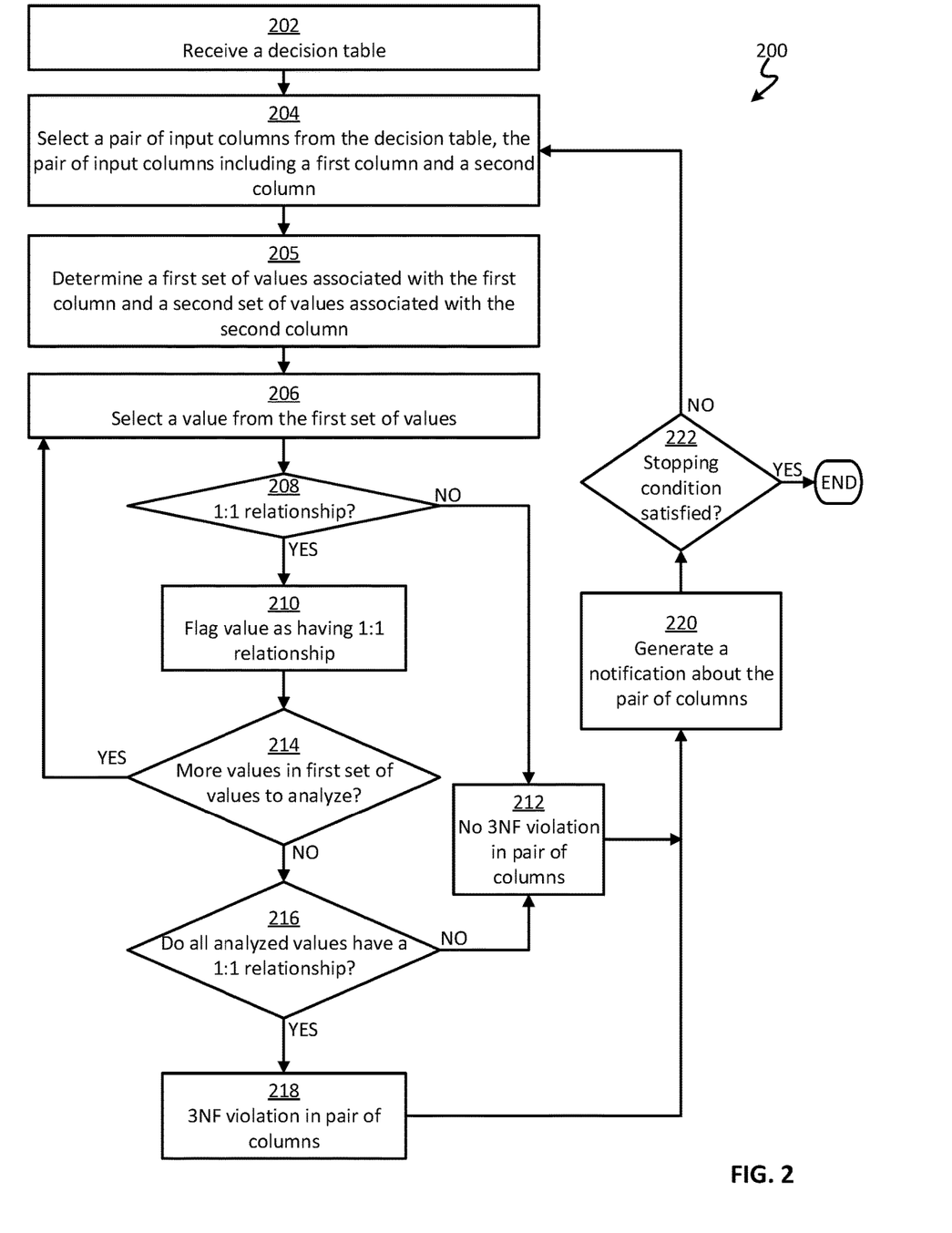
FIG. 2 is a flow chart of an example of a process for automatically validating decision tables according to some aspects of the present disclosure.

Regardless of the location of the DTV tool 108, in some examples the DTV tool 108 can determine whether the decision table 106 violates a third normal form constraint by executing the process 200 shown in FIG. 2. Of course, the process 200 shown in FIG. 2 is intended to be exemplary and non-limiting. Other examples may involve more steps, fewer steps, different steps, or a different order of the steps shown in FIG. 2. The steps of FIG. 2 are described below with reference to the components of FIG. 1 described above.

In block 202, the DTV tool 108 receives a decision table 106. The DTV tool 108 can receive the decision table 106 from any suitable source. For example, the DTV tool 108 can receive the decision table 106 from memory, where it may be stored by the drafting software 104. Additionally or alternatively, the DTV tool 108 can receive the decision table 106 from the computing device 102 over the network 116.

In block 204, the DTV tool 108 selects a pair of input columns from the decision table 106. The pair of input columns includes a first column and a second column. As used herein, the terms "first" and "second" are used to distinguish columns from one another for clarity, and not necessarily to identify specific column numbers. The pair of input columns can be any suitable pair of input columns, such as any unique pair of input columns that have not been previously selected by the DTV tool 108 during prior iterations of the process 200.

In block 205, the DTV tool 108 determines a first set of values associated with the first column and a second set of values associated with the second column. The first set of values may include some or all of the values in the cells of the first column. For example, the DTV tool 108 may select, as the first set of values, all of the values in the first column except an everything operator (e.g., "–") value. The second set of values may also include some or all of the values in the cells of the second column. For example, the DTV tool 108 may select, as the second set of values, all of the values in the second column except for an everything operator value.

In some examples, the DTV tool 108 can generate the first set of values by transforming some or all of the values in the first column into value ranges. For example, a value of ">=0" can be transformed into an equivalent range with an endpoint defined, such as [0 . . . +inf]. A simple value such as "47" can be transformed into an equivalent range representing a single point, such as "[47 . . . 47]". An everything operator ("–") can be transformed into an equivalent range spanning infinity or the boundary of the column domain, such as [–Inf . . . +Inf]. Values that are already ranges, such as [1 . . . 2], may remain in their original state. String values such as "Medium" can be transformed into an equivalent range such as ["Medium" . . . "Medium"]. Any suitable approach can be used to transform the values in the first column into value ranges. Additionally, the DTV tool 108 can generate the second set of values by transforming some or all of the values in the second column into value ranges. This may be accomplished by using similar techniques as described above. Converting the values in the decision table 106 into value ranges can make the values easier to compare to one another in subsequent steps of the process 200.

In block 206, the DTV tool 108 selects a value from the first set of values associated with the first column. For example, the DTV tool 108 can select the first column 122a and the second column 122b from the decision table 106 as the pair of input columns. The first column 122a has a first set of cells with a first set of values (">=21", ">=21", and "<21") and the second column 122b has a second set of cells with a second set of values (e.g., "<10", ">=10", "<10"). The DTV tool 108 can select the value ">=21" from the first set of values associated with the first column 122a. As another example, the DTV tool 108 may have previously transformed the value of ">=21" into the value range [21 . . . +inf], so the DTV tool 108 can select that value range.

In block 208, the DTV tool 108 determines whether there is a one-to-one relationship between (i) the value selected from the first set of values associated with the first column and (ii) a corresponding value in the second set of values associated with the second column. A one-to-one relationship exists when a value in the first set of values always has the same corresponding value in the second set of values. In contrast, a one-to-many relationship exists when a value in the first set of values has multiple corresponding values in the second set of values. To make this determination, the DTV tool 108 may use any suitable technique. For example, the DTV tool 108 can identify one or more entries (e.g., rows) in the decision table 106 that include cells associated with the selected value in the first column. The DTV tool 108 can then determine whether the one or more entries have the corresponding value in the second set of values associated with the second column. If so, the DTV tool 108 may determine that the selected value has a one-to-one relationship with the corresponding value.

As one specific example, the DTV tool 108 can determine that the value ">=21" in the first entry 120a of the decision table 106 has a corresponding value of "<10" in the second column 122b. The DTV tool 108 can also determine that the value ">=21" in the second entry 120b of the decision table 106 has a corresponding value of ">=10" in the second column 122b. Since the value ">=21" sometimes corresponds to "<10" in the second column 122b and other times corresponds to ">=10" in the second column 122b, the DTV tool 108 may determine that the value ">=21" has a one-to-many relationship.

As another example, the DTV tool 108 may have previously transformed the value ">=21" in the first column 122a of the decision table 106 into the value range "[21 . . . +inf]". The DTV tool 108 may have also previously transformed the value "<10" in the second column 122b of the decision table 106 into the value range "[–inf . . . 10)". The DTV tool 108 may have further previously transformed the value ">=10" in the second column 122b of the decision table 106 into the value range "[10 . . . +inf]". The DTV tool 108 may then determine that the value range "[21 . . . +inf]" sometimes corresponds to "[–inf . . . 10)" and other times corresponds to "[10 . . . +inf]". So, the DTV tool 108 may determine that the value "[21 . . . +inf]" has a one-to-many relationship.

As still another example, the selected pair of input columns can include the second column 122b and the third column 122c. The selected value can be "<10" in the second column 122b. The DTV tool 108 can determine that the value "<10" in the first entry 120a of the decision table 106 has a corresponding value of "Medium" in the third column 122c. The DTV tool 108 can also determine that the value "<10" in the third entry 120c of the decision table 106 has a corresponding value of "Medium" in the third column 122c. Because the selected value of "<10" corresponds to "Medium" in both entries, the DTV tool 108 may determine that the selected value of "<10" has a one-to-one relationship.

If the DTV tool 108 determines that the value selected from the first set of values does not have a one-to-one relationship with a corresponding value in the second set of values, the process 200 can proceed to block 212. In block 212, the DTV tool 108 determines that there is not a third normal form violation with respect to the selected pair of input columns. This is because there is likely not a dependency relationship between the pair of input columns (e.g., the first column is independent of the second column).

If the DTV tool 108 determines that the value selected from the first set of values does have a one-to-one relationship with a corresponding value in the second set of values, the process 200 can proceed to block 210. In block 210, the DTV tool 108 flags the selected value as having the one-to-one relationship.

The process 200 can next continue to block 214, where the DTV tool 108 determines whether there are any more values in the first set of values associated with the first column that should be analyzed. If so, the process can return to block 206, where another value can be selected from the first set of values and blocks 208-214 can iterate. Once there are no more values in the first set of values to analyze, the process can continue to block 216.

In block 216, the DTV tool 108 determines whether all of the analyzed values (from the first set of values) have a one-to-one relationship with corresponding values in the second set of values. For example, the DTV tool 108 can determine if each analyzed value was flagged as having a one-to-one relationship. If not, the process can continue to block 212, where the DTV tool 108 can determine that there is not a third normal form violation with respect to the selected pair of input columns. Otherwise, the process can continue to block 218. In block 218, the DTV tool 108 determines that a third normal form violation exists with respect to the selected pair of input columns. This is because there is likely a dependency relationship between the pair of input columns.

In block 220, the DTV tool 108 generates a notification 114 (e.g., for the user 112) about the selected pair of input columns. For example, the notification 114 can indicate that there is a third normal form violation with respect to the pair of input columns. As another example, the notification 114 can indicate that there is not a third normal form violation with respect to the pair of input columns. Alternatively, if there is not a third normal form violation, the DTV tool 108 may forgo emitting a notification and this step may be skipped (e.g., the process 200 can proceed directly to block 222).

In some examples, the DTV tool 108 can automatically break the pair of input columns into separate decision tables in response to determining that they violate third normal form constraints. For example, the DTV tool 108 can extract the values from the first column 122a and incorporate the values into a new decision table. The DTV tool 108 may also include keys in the new decision table, where the keys can be used in the original decision table 106 to link to the values in the new decision table. The DTV tool 108 can then update the original decision table 106 with the appropriate keys, for example to create explicit dependencies among the columns. As a result of this process, the original decision table 106 may comply with third normal form constraints.

In block 222, the DTV tool 108 determines if a stopping condition is satisfied. An example of the stopping condition may be that every pair of input columns in the decision table 106 has been analyzed. If the stopping condition has not been satisfied, the process 200 can return to block 204, where another pair of input columns can be selected from the decision table 106 and the process can repeat. In this way, the process 200 can iterate multiple times. If the stopping condition has been satisfied, the process 200 may end.

Figure 3:
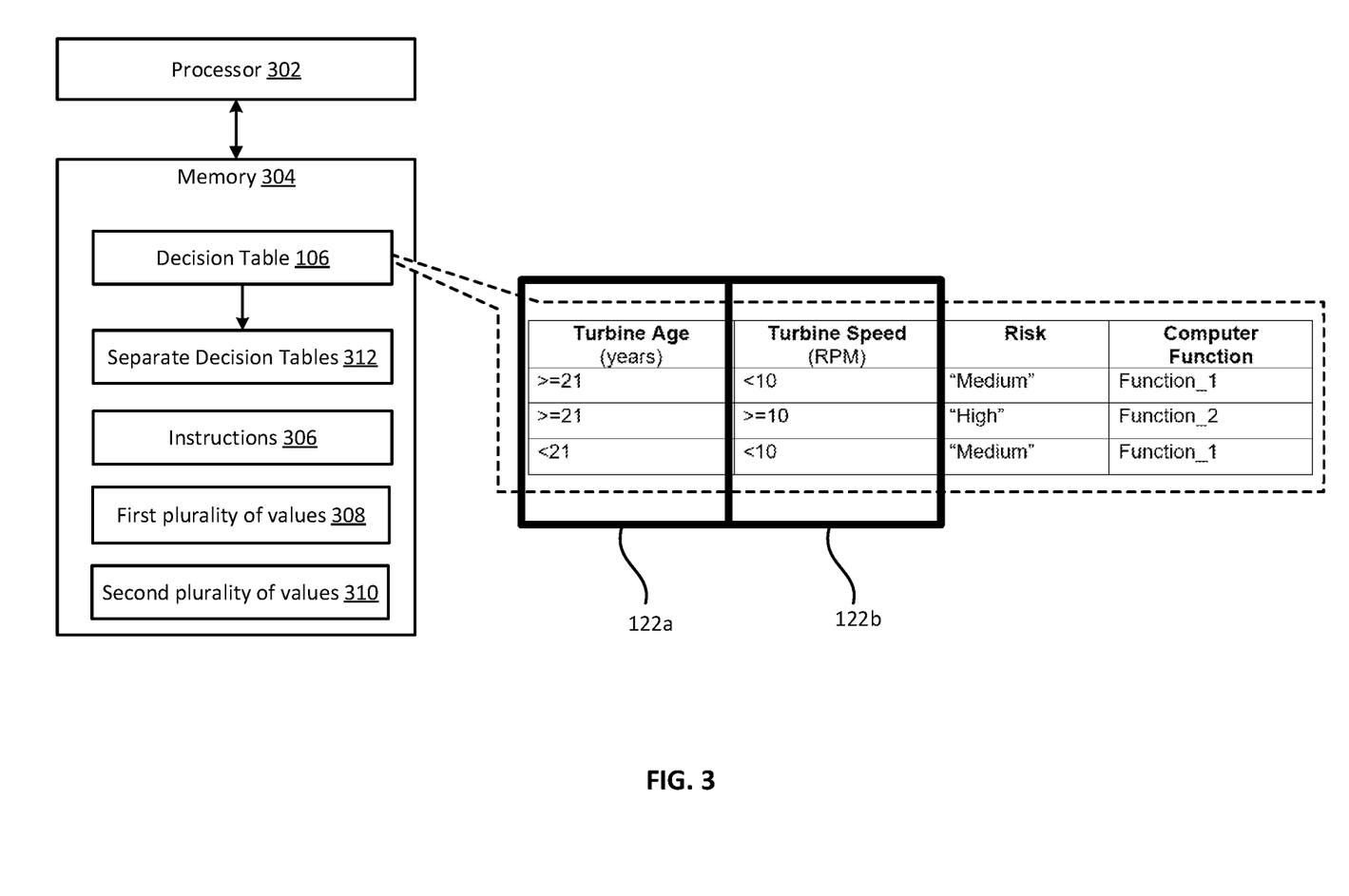
FIG. 3 is a block diagram of another example of a system for automatically validating decision tables according to some aspects of the present disclosure.

FIG. 3 is a block diagram of another example of a system 300 for automatically validating decision tables according to some aspects of the present disclosure. The system 300 includes a processor 302 communicatively coupled to a memory 304. In some examples, the processor 302 and the memory 304 can be part of the same computing device, such as the computing device 102 of FIG. 1. In other examples, the processor 302 and the memory 304 can be distributed from (e.g., remote to) one another.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. The instructions 306 may include processor-specific instructions generated by a compiler or an interpreter from code written in any suitable computer-programming language, such as C, C++, C#, etc. In some examples, the instructions 306 can include the decision table validation tool 108 of FIG. 1.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can include a non-transitory computer-readable medium from which the processor 302 can read instructions 306. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processor 302 can execute the instructions 306 to perform an iterative process, such as the process 200 of FIG. 2 described above. For example, the processor 302 can determine a first plurality of values 308 associated with a first column in a decision table 106 and a second plurality of values 310 associated with a second column in the decision table 106. The processor 302 can select the first column and the second column for use during a current iteration of an iterative process, such as the iterative process described above. An example of the first column can be column 122a and an example of the second column can be column 1122b, as shown using bold boxes in FIG. 3.

In some examples, the first plurality of values 308 can be the values expressly included in the first column, and the second plurality of values 310 can be the values expressly included in the second column. In other examples, the first plurality of values 308 can be value ranges derived from the values expressly included in the first column, and the second plurality of values 310 can be value ranges derived from the values expressly included in the second column.

Next, the processor 302 can determine that each respective value in the first plurality of values 308 has a one-to-one relationship with a corresponding value in the second plurality of values 310. Based on determining that each respective value in the first plurality of values 308 has the one-to-one relationship, the processor 302 can determine that the first column and second column violate a third normal form constraint. Based on determining that the first column and second column violate the third normal form constraint, the processor 302 can reorganize the first column and the second column into separate decision tables 312 that comply with the third normal form constraint. This automated reorganization is represented in FIG. 3 by an arrow from the original decision table 106 to the separate decision tables 312. But, in some examples the separate decision tables 312 may include a modified version of the original decision table 106 and one or more additional decision tables.

Figure 4:
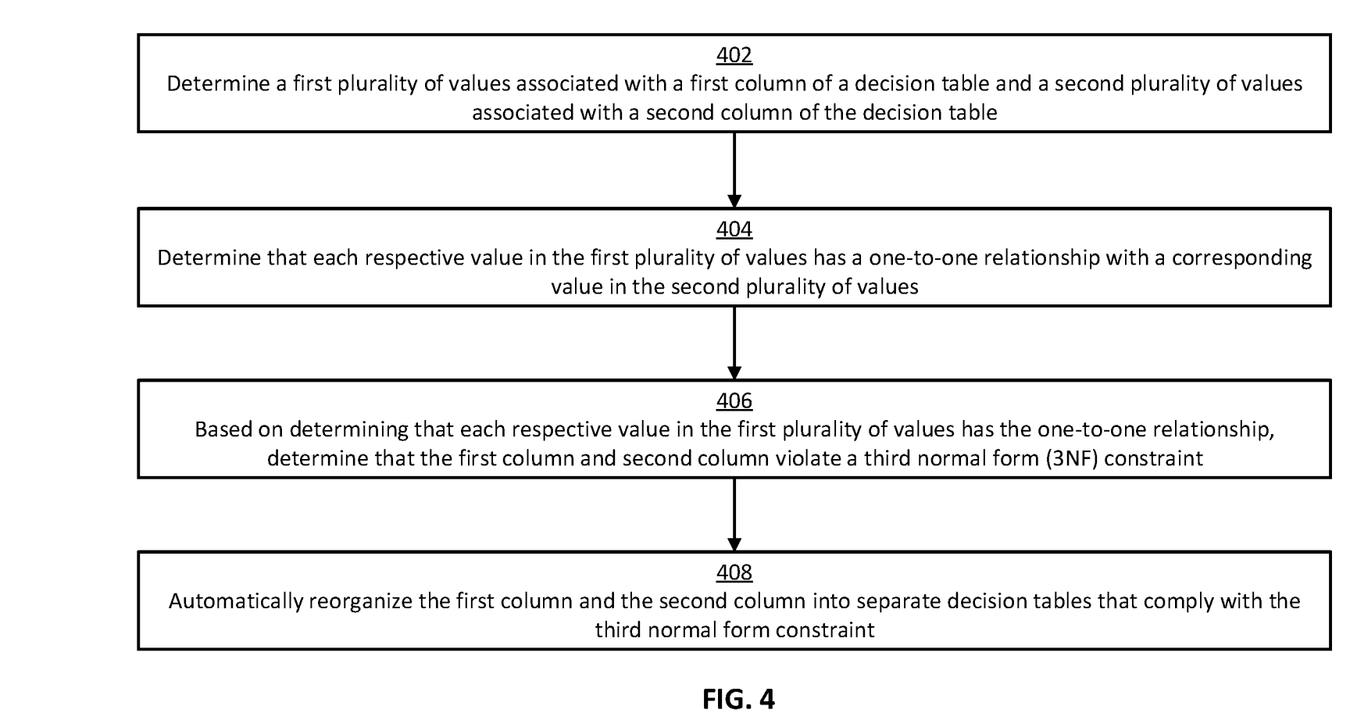
FIG. 4 is a flow chart of another example of a process for automatically validating decision tables according to some aspects of the present disclosure.

In some examples, the processor 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, the processor 302 determines a first plurality of values 308 associated with the first column of a decision table 106 and a second plurality of values 310 associated with a second column of the decision table 106. The first column and the second column may be selected from the decision table 106 by the processor 302 for use during a current iteration of an iterative process.

In some examples, the first plurality of values 308 can be the values expressly included in the first column. Additionally or alternatively, the second plurality of values 310 can be the values expressly included in the second column. In other examples, the first plurality of values 308 can be value ranges generated based on the values included in the first column. Additionally or alternatively, the second plurality of values 310 can be value ranges generated based on the values included in the second column.

In block 404, the processor 302 determines that each respective value in the first plurality of values 308 has a one-to-one relationship with a corresponding value in the second plurality of values 310. For example, the selected pair of input columns can include the second column 122b and the third column 122c of the decision table 106. The first plurality of values 308 can include the value range "[-inf . . . 10]," which the processor 302 may have derived from the value "<10" in the second column 122b. The processor 302 can select the value range "[-inf . . . 10]" from the first plurality of values 308 and determine that it always corresponds to the value range of "[Medium . . . Medium]" in second plurality of values 310. This is because, even though the value range "[-inf . . . 10]" may be present twice in the first plurality of values 308 since the value "<10" is present twice in the decision table 106, in both instances it is correlated to the same value range of "[Medium . . . Medium]" in second plurality of values 310. As a result, the processor 302 can determine that the selected value of "[-inf . . . 10]" has a one-to-one relationship. The processor 302 can repeat this process for each respective value in the first plurality of values 308, to determine that each respective value in the first plurality of values 308 has a one-to-one relationship with a corresponding value in the second plurality of values 310.

In block 406, the processor 302 determines that the first column and second column violate a third normal form constraint, based on determining that each respective value in the first plurality of values 308 has the one-to-one relationship.

In block 408, the processor 302 automatically reorganizes the first column and the second column into separate decision tables 312 that comply with the third normal form constraint. For example, the processor 302 can extract the values from the first column and incorporate the values into a new decision table. The processor 302 may also include keys in the new decision table, where the keys can be used in the original decision table 106 to link to the values in the new decision table. The processor 302 can then update the original decision table 106 with the appropriate keys, for example to create explicit dependencies among the columns. As a result of this process, the original decision table 106 may comply with third normal form constraints.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
a processor; and
a memory including instructions that are executable by the processor for causing the processor to:
execute an iterative process for validating a decision table comprising decision logic for a software program, wherein an iteration of the iterative process involves:
determining a first plurality of values associated with a first column of the decision table and a second plurality of values associated with a second column of the decision table;
determining that each respective value in the first plurality of values has a one-to-one relationship with a corresponding value in the second plurality of values;
based on determining that each respective value in the first plurality of values has the one-to-one relationship, determining that the first column and second column violate a third normal form (3NF) constraint; and
based on determining that the first column and the second column violate the 3NF constraint, automatically reorganizing the first column and the second column into separate decision tables that comply with the 3NF constraint; and
after validating the decision table, execute the software program based on the separate decision tables, the separate decision tables being usable in place of the decision table to reduce logical inconsistencies associated with software malfunctions.

2. The system of claim 1, wherein the instructions are further executable by the processor for causing the processor to:
for each respective value in the first plurality of values:
identify one or more entries in the decision table that include cells associated with the respective value in the first column;
determine that the one or more entries only have the corresponding value in the second plurality of values associated with the second column; and
based on determining that the one or more entries only have the corresponding value in the second plurality of values, flag the respective value as having the one-to-one relationship.

3. The system of claim 1, wherein the first plurality of values are a first plurality of value ranges.

4. The system of claim 3, wherein the second plurality of values are a second plurality of value ranges.

5. The system of claim 1, wherein the iterative process is configured for analyzing multiple pairs of columns in the decision table to determine whether each pair of columns violates the 3NF constraint, each pair of columns being analyzed in a separate iteration of the iterative process and being different from other pairs of columns analyzed during the iterative process.

6. The system of claim 1, wherein the first column and the second column are input columns having non-key values in the decision table, and wherein the instructions are further executable by the processor for causing the processor to output a notification indicating that there is a dependency relationship between the first column and the second column.

7. The system of claim 1, wherein the instructions are further executable by the processor for causing the processor to execute another iteration of the iterative process, involving:
 selecting a pair of columns from the decision table;
 determining that a one-to-many relationship exists between a group of values associated with the pair of columns, such that a single value associated with one column of the pair of columns has multiple corresponding values associated with another column of the pair of columns; and
 based on determining that the one-to-many relationship exists between the group of values, generating a notification indicating that the pair of columns complies with the 3NF constraint.

8. A method comprising:
 determining, by a processor, a first plurality of values associated with a first column of a decision table and a second plurality of values associated with a second column of the decision table, wherein the decision table includes decision logic for a software program;
 determining, by the processor, that each respective value in the first plurality of values has a one-to-one relationship with a corresponding value in the second plurality of values;
 based on determining that each respective value in the first plurality of values has the one-to-one relationship, determining, by the processor, that the first column and second column violate a third normal form (3NF) constraint;
 automatically reorganizing, by the processor, the first column and the second column into separate decision tables that comply with the 3NF constraint; and
 executing the software program based on the separate decision tables, the separate decision tables being used in place of the decision table to reduce logical inconsistencies associated with software malfunctions.

9. The method of claim 8, further comprising, for each respective value in the first plurality of values:
 identifying, by the processor, one or more entries in the decision table that include cells associated with the respective value in the first column;
 determining, by the processor, that the one or more entries only have the corresponding value in the second plurality of values associated with the second column; and
 based on determining that the one or more entries only have the corresponding value in the second plurality of values, flagging, by the processor, the respective value as having the one-to-one relationship.

10. The method of claim 8, wherein the first plurality of values are a plurality of value ranges.

11. The method of claim 8, wherein the second plurality of values are a plurality of value ranges.

12. The method of claim 8, further comprising:
 analyzing, by the processor, every pair of columns in the decision table to determine whether the pair of columns violates the 3NF constraint, each pair of columns being analyzed in a separate iteration of an iterative process and being different from other pairs of columns analyzed during the iterative process.

13. The method of claim 8, wherein the first column and the second column are input columns of the decision table.

14. The method of claim 8, further comprising:
 selecting, by the processor, a pair of columns from the decision table;
 determining, by the processor, that a one-to-many relationship exists between a group of values associated with the pair of columns, such that a single value associated with one column of the pair of columns has multiple corresponding values associated with another column of the pair of columns; and
 based on determining that the one-to-many relationship exists between the group of values, generating, by the processor, a notification indicating that the pair of columns complies with the 3NF constraint.

15. A non-transitory computer-readable medium comprising program code that is executable by a processor for causing the processor to:
 execute an iterative process, wherein an iteration of the iterative process involves:
  determining a first plurality of values associated with a first column of a decision table and a second plurality of values associated with a second column of the decision table, wherein the decision table includes decision logic for a software program;
  determining that each respective value in the first plurality of values has a one-to-one relationship with a corresponding value in the second plurality of values;
  based on determining that each respective value in the first plurality of values has the one-to-one relationship, determining that the first column and second column violate a third normal form (3NF) constraint; and
  based on determining that the first column and the second column violate the 3NF constraint, automatically reorganizing the first column and the second column into separate decision tables that comply with the 3NF constraint; and
 execute the software program based on the separate decision tables, the separate decision tables being used in place of the decision table to reduce logical inconsistencies associated with software malfunctions.

16. The non-transitory computer-readable medium of claim 15, further comprising program code that is executable by the processor for causing the processor to:
 for each respective value in the first plurality of values:
  identify one or more entries in the decision table that include cells associated with the respective value in the first column;
  determine that the one or more entries only have the corresponding value in the second plurality of values associated with the second column; and
  based on determining that the one or more entries only have the corresponding value in the second plurality of values, flag the respective value as having the one-to-one relationship.

17. The non-transitory computer-readable medium of claim 15, wherein the first plurality of values are a first plurality of value ranges and the second plurality of values are a second plurality of value ranges.

18. The non-transitory computer-readable medium of claim 15, wherein the iterative process is configured for analyzing every pair of columns in the decision table to determine whether the pair of columns violates the 3NF constraint, each pair of columns being analyzed in a separate iteration of the iterative process and being different from other pairs of columns analyzed during the iterative process.

19. The non-transitory computer-readable medium of claim 15, wherein the first column and the second column are input columns of the decision table.

20. The non-transitory computer-readable medium of claim 15, further comprising program code that is executable by the processor for causing the processor to execute another iteration of the iterative process, involving:
- selecting a pair of columns from the decision table;
- determining that a one-to-many relationship exists between a group of values associated with the pair of columns, such that a single value associated with one column of the pair of columns has multiple corresponding values associated with another column of the pair of columns; and
- based on determining that the one-to-many relationship exists between the group of values, generating a notification indicating that the pair of columns complies with the 3NF constraint.

* * * * *